United States Patent
Codilian

(10) Patent No.: US 6,781,780 B1
(45) Date of Patent: Aug. 24, 2004

(54) METHOD AND SYSTEM FOR PREVENTING DATA LOSS FROM AN OFF-TRACK WRITE CONDITION IN A DISK DRIVE BY REWRITING DATA BUFFERED FROM AN ADJACENT TRACK

(75) Inventor: Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 257 days.

(21) Appl. No.: 09/887,749

(22) Filed: Jun. 21, 2001

(51) Int. Cl.[7] .......................... G11B 15/04; G11B 19/04; G11B 21/02; G11B 5/09
(52) U.S. Cl. ........................ 360/60; 360/75; 360/77.12; 360/53
(58) Field of Search ............................ 360/46, 51, 60, 360/77.12, 53, 75

(56) References Cited

U.S. PATENT DOCUMENTS

| | | | |
|---|---|---|---|
| 5,392,290 A | * 2/1995 | Brown et al. .................. | 714/6 |
| 5,790,333 A | * 8/1998 | Kimura et al. ................ | 360/60 |
| 6,178,058 B1 | * 1/2001 | Pan et al. ..................... | 360/60 |
| 6,310,741 B1 | * 10/2001 | Nishida et al. ............... | 360/53 |
| 6,404,570 B1 | * 6/2002 | McNeil et al. ........... | 360/77.02 |

* cited by examiner

*Primary Examiner*—David Hudspeth
*Assistant Examiner*—Glenda P. Rodriguez
(74) *Attorney, Agent, or Firm*—Milad G. Shara, Esq.; Burns Doane Swecker & Mathis

(57) ABSTRACT

A method and system are described for preventing data loss from an off-track write condition in a disk drive. In accordance with exemplary embodiments of the present invention, the disk drive comprises a disk surface comprising a first track and a second track adjacent to the first track, and a head for writing data to and reading data from the first and second tracks. The method of recovering from the off-track write condition comprises the steps of receiving a write command to write a first series of data blocks on the first track. Before writing the first series of data blocks, a second series of data blocks stored in the second track is read and stored in a data buffer. Writing the first series of data blocks on the first track is initiated, and while writing the first series of data blocks, detecting a signal indicating the head may have wandered toward the second track and in response to the signal: aborting the writing of the first series of data blocks; repositioning the head on the first track and performing track following; writing at least a portion of the first series of data blocks to the first track; and writing at least a portion of the second series of data blocks, stored in the data buffer, to the second track.

14 Claims, 5 Drawing Sheets

METHOD AND SYSTEM FOR PREVENTING DATA LOSS FROM AN OFF-TRACK WRITE CONDITION IN A DISK DRIVE BY REWRITING DATA BUFFERED FROM AN ADJACENT TRACK

BACKGROUND

1. Field of the Invention

The present invention relates to disk drives. More particularly, the present invention relates to a method and system for preventing data loss from an off-track write condition in a disk drive by rewriting data buffered from an adjacent track.

2. Background Information

In a magnetic disk drive, data is typically recorded on a disk surface in concentric tracks which are partitioned into data blocks referred to as data sectors. In order to write or read data to from a particular data sector, a servo control system within the disk drive performs a seek operation to position a head over a target track, and then a tracking operation to maintain the head over a centerline of the target track while writing or reading data. During the seek operation, the servo control system controls a voice coil motor (VCM) so as to rotate an actuator arm to which the head is connected until the head is positioned radially over the target track. The servo control system then makes fine adjustments to the VCM to make the head maintain centerline tracking. To facilitate positioning the head, embedded servo sectors comprising head positioning information are typically recorded at equally-spaced distances around each track of the disk. For example, a servo sector may comprise a track address which identifies the current track location of the head for coarse positioning while seeking to the target track, as well as servo bursts recorded at precise intervals and offsets from a track's centerline which provide a centerline offset for use in tracking.

Various system dynamics may cause an off-track write condition during a write operation wherein the head's position relative to the track's centerline exceeds a prescribed threshold during tracking. For instance, an external, mechanical shock to the disk drive can induce a corresponding acceleration of the actuator arm which moves the arm away from the track center.

When an off-track write condition is detected a conventional response is simply to abort the current write operation, wait for the disk to rotate until the head is again over the beginning of the target data sector, and then rewrite the data sector. However, this recovery technique does not take into account the adverse impact that an off-track write condition may have on the data sectors of adjacent tracks. That is, during an off-track write condition the head may cross over into an adjacent track and corrupt the data recorded in an adjacent data sector.

U.S. Pat. No. 5,909,334 (Barr et al.) (the '334 patent) discloses a method and apparatus for verifying that data written on magnetic disk media can be successfully recovered in subsequent read operations and ensuring that the data to be written is held by a buffer until a read-verify operation indicates that the buffer space storing the data may be relinquished for new operations. The '334 patent is hereby incorporated by reference in its entirety. According to the '334 patent, the drive tests a data block, which includes redundancy data, read from the disk to determine if the data is within correctable limits. If the data is outside correctable limits, the data is re-written until it is within correctable limits or until a predetermined count limit is reached.

There is a need for an improved technique for preventing data loss from an off-track write condition in a disk drive which results in a head crossing over and corrupting data in an adjacent track.

SUMMARY OF THE INVENTION

A method and system are described for preventing data loss from an off-track write condition in a disk drive. In accordance with exemplary embodiments of the present invention, the disk drive comprises a disk surface comprising a first track and a second track adjacent to the first track, and a head for writing data to and reading data from the first and second tracks. The method of recovering from the off-track write condition comprises the steps of receiving a write command to write a first series of data blocks on the first track. Before writing the first series of data blocks, a second series of data blocks stored in the second track is read and stored in a data buffer. Writing the first series of data blocks on the first track is initiated, and while writing the first series of data blocks, detecting a signal indicating the head may have wandered toward the second track and in response to the signal: aborting the writing of the first series of data blocks; repositioning the head on the first track and performing track following; writing at least a portion of the first series of data blocks to the first track; and writing at least a portion of the second series of data blocks, stored in the data buffer, to the second track.

The present invention may also be regarded as a disk drive comprising a disk surface comprising a first track and a second track adjacent to the first track, and a head for writing and reading data stored in the first and second tracks, wherein the head writes at least part of a first data block to the first track. The disk drives comprises a read/write channel for encoding data written to the disk surface during a write operation and for detecting a read signal emanating from the head during a read operation, a servo control system for generating control signals to position the head over the disk surface, an off-track write condition detector for detecting an off-track write condition, and a data buffer for storing a data block written to the disk. The disk drive further comprises a program memory for storing steps of a procedure for preventing data loss from an off-track write condition detected by the off-track write condition detector, and a means, coupled to the read/write channel, the servo control system and the off-track write condition detector, for executing the steps of the data loss prevention procedure stored in the program memory in response to the detected off-track write condition.

The data loss prevention procedure includes the steps of: receiving a write command to write a first series of data blocks on the first track; before writing the first series of data blocks, reading a second series of data blocks stored in the second track and storing the second series of data blocks in a data buffer; initiating writing of the first series of data blocks on the first track and while writing the first series of data blocks, detecting a signal indicating the head may have wandered toward the second track and in response to the signal: aborting the writing of the first series of data blocks; repositioning the head on the first track and performing track following; writing at least a portion of the first series of data blocks to the first track; and writing at least a portion of the second series of data blocks, stored in the data buffer, to the second track.

BRIEF DESCRIPTION OF THE DRAWING FIGURES

Other objects and advantages of the present invention will become apparent to those skilled in the art upon reading the following detailed description of preferred embodiments, in conjunction with the accompanying drawings, wherein like reference numerals have been used to designate like elements, and wherein.

Figure 1:
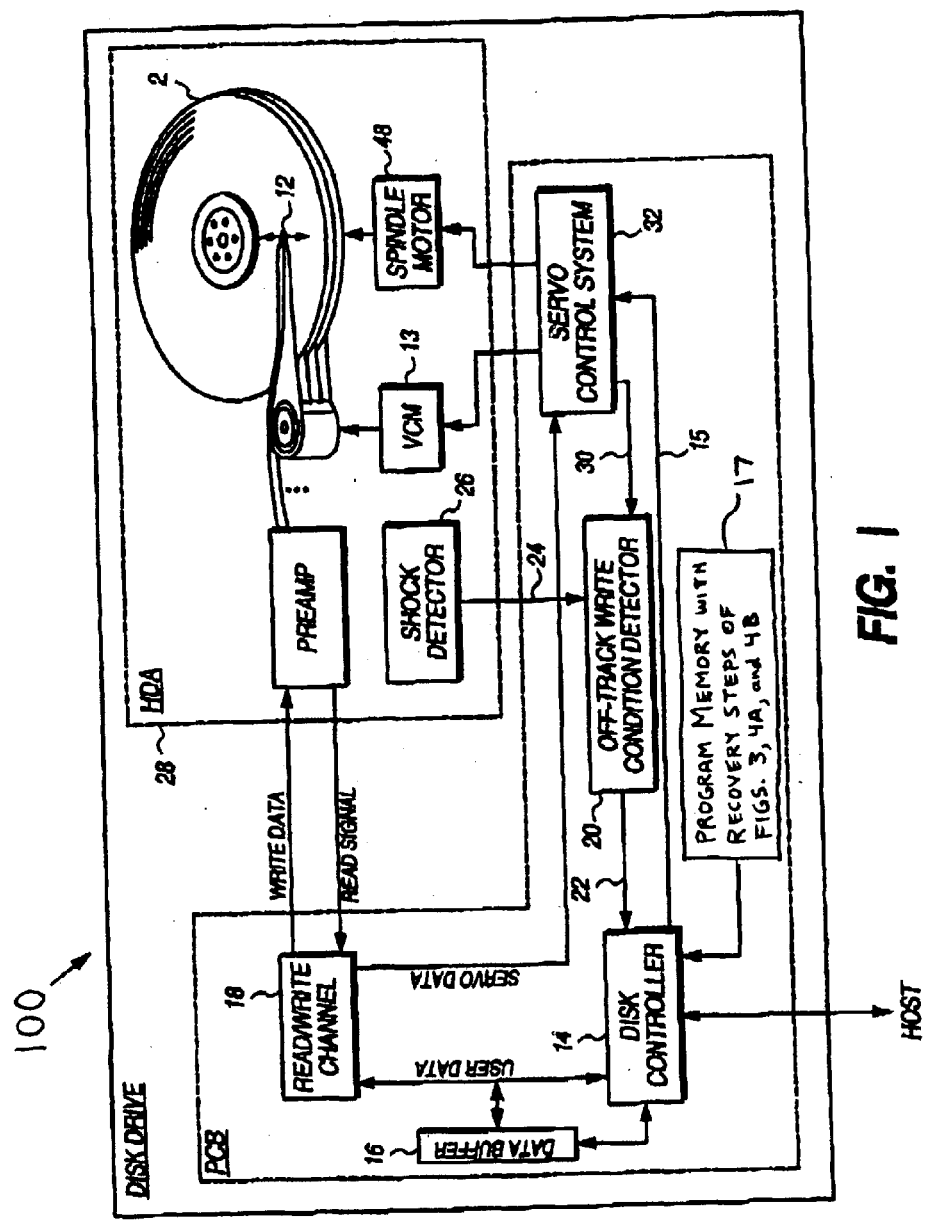
FIG. 1 illustrates the components in a disk drive implementing a recovery procedure for recovering from an off-track write condition during a write operation in accordance with an exemplary embodiment of the present invention.
Figure 3:
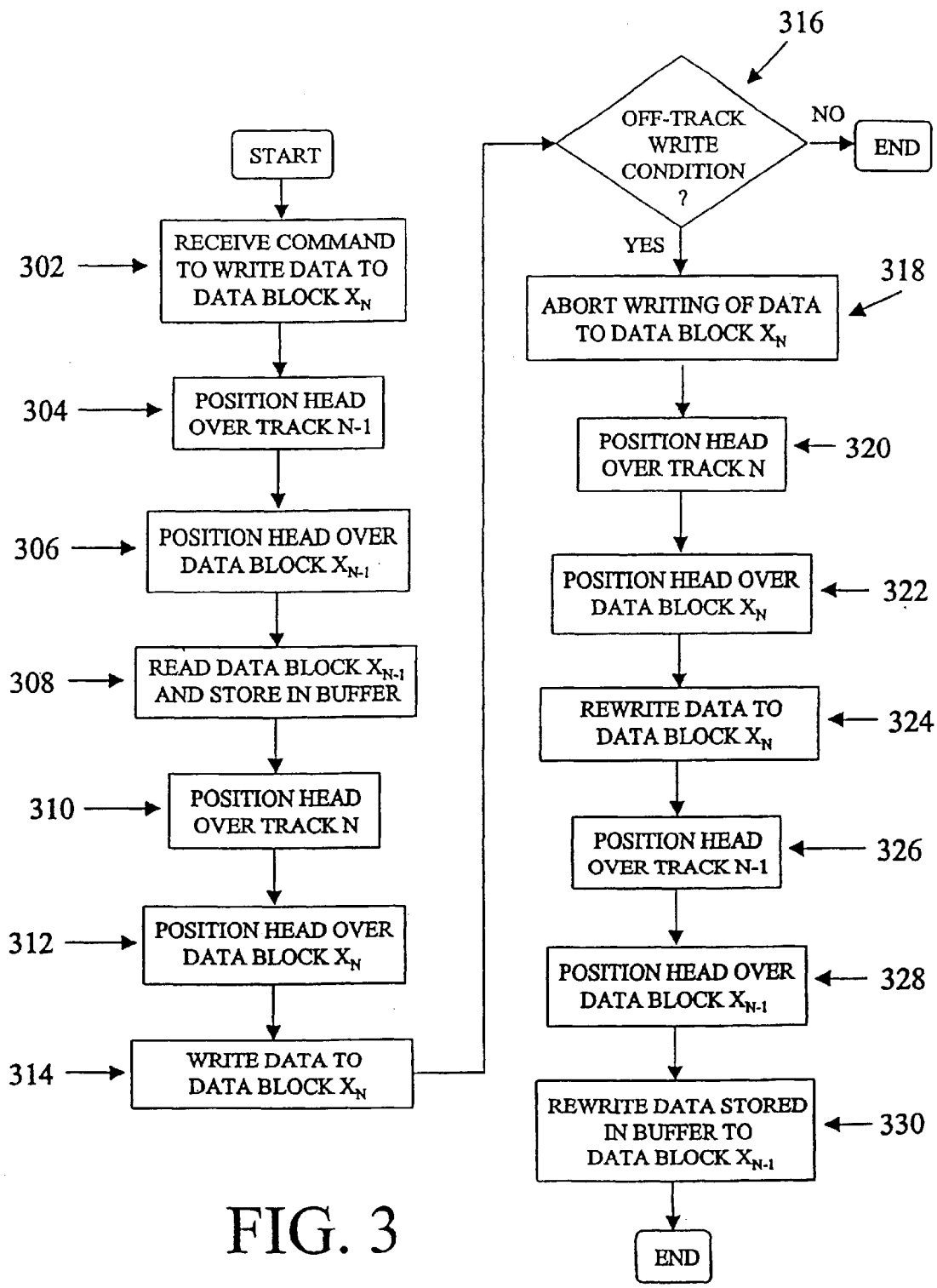
Figure 4A:
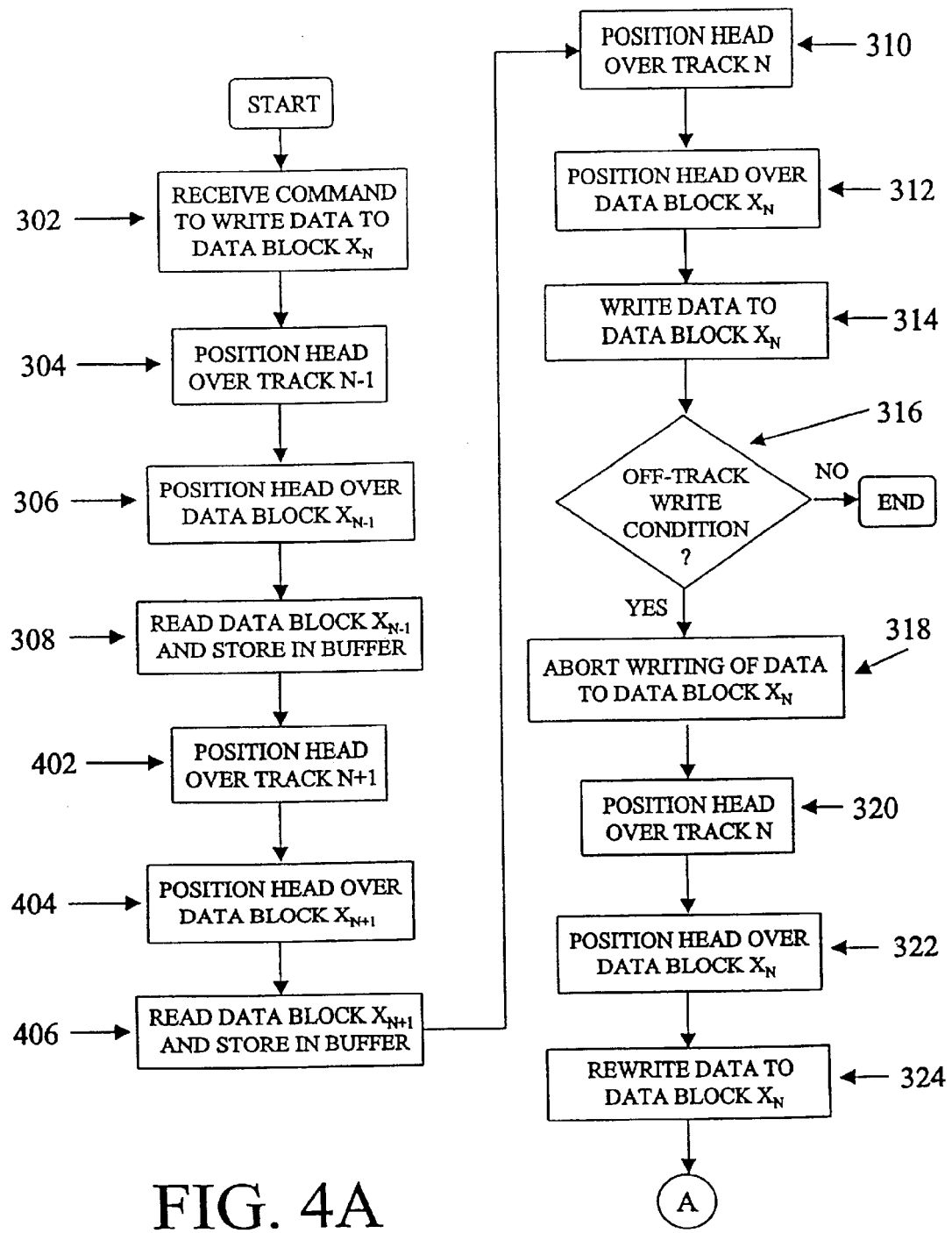
Figure 4B:
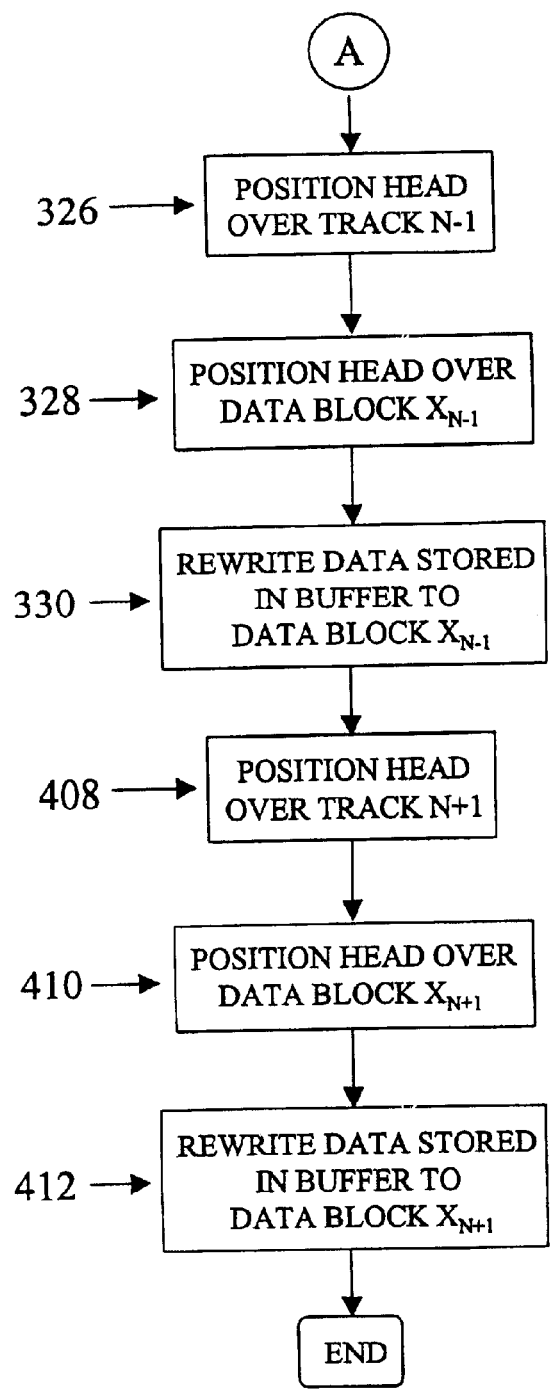

FIG. 3 is a flow diagram showing the steps executed by the disk controller of FIG. 1 to effectuate the recovery procedure in response to a detected off-track write condition, including the steps of reading and rewriting an adjacent data sector of an adjacent track, in accordance with an exemplary embodiment of the present invention; and FIGS. 4A and 4B are a flowcharts showing the steps executed by the disk controller of FIG. 1 to effectuate the recovery procedure in response to a detected off-track write condition, including the steps of reading and rewriting adjacent data sectors of both adjacent tracks, in accordance with an exemplary embodiment of the present invention.

DETAILED DESCRIPTION OF THE PREFERRED EMBODIMENTS

FIG. 1 is a block diagram of a disk drive 100 implementing a data loss prevention procedure for recovering from an off-track write condition in a disk drive in accordance with an exemplary embodiment of the present invention. According to an exemplary embodiment of the present invention, disk drive 100 can comprise a disk surface comprising a first track and a second track adjacent to the first track, a head for writing and reading data stored in the first and second tracks, wherein the head writes at least part of a first data block to the first track, and a servo control system for generating control signals to position the head over the disk surface. Although the head can, if desired, perform both reading and writing, the head can include a common element or, alternately can include separate elements for the reading and writing. According to exemplary embodiments, disk drive 100 can include a disk surface 2 rotated about a spindle by a spindle motor (not shown), a head 12 for writing and reading data recorded in concentric tracks on disk surface 2, and a voice coil motor (VCM) 13 for actuating head 12 over disk surface 2, and a servo control system 32 for generating control signals for controlling operation of VCM 13 to position head 12 over disk surface 2.

Disk drive 100 can also comprise a read/write channel for encoding data written to the disk surface during a write operation and for detecting a read signal emanating from the head during a read operation, a data buffer for storing a data block written to the disk, and an off-track write condition detector for detecting an off-track write condition. According to exemplary embodiments, disk drive 100 can also include a read/write channel 18 for encoding data written to disk surface 2 during a write operation and for detecting an estimated data sequence from a read signal emanating from head 12 during a read operation, a data buffer 16 for storing a data block written to and read from disk surface 2, and an off-track write condition detector 20 for detecting an off-track write condition.

Disk drive 100 can also comprise a program memory for storing steps of a procedure for preventing data loss from an off-track write condition detected by the off-track write condition detector, and a means, coupled to the read/write channel, the servo control system and the off-track write condition detector, for executing the steps of the data loss prevention procedure stored in the program memory in response to the detected off-track write condition. According to exemplary embodiments of the present invention, disk drive 100 can include a suitable means, such as disk controller 14, coupled to read/write channel 18, servo control system 32, and off-track write condition detector 20, for executing the steps of the data loss prevention procedure stored in a program memory 17 in response to the detected off-track write condition.

The concentric tracks on disk surface 2 can be partitioned into data blocks referred to as data sectors, where data is written to and read from disk surface 2 a data sector at a time. During a write operation, a disk controller 14 can receive write data from a host to be written to disk surface 2. Disk controller 14 can generate a target track signal communicated over line 15 to servo control system 32 which can position the head over the target track and maintain centerline tracking during the write operation. Off-track write condition detector 20 can monitor whether an off-track write condition occurs during the write operation which can be communicated to disk controller 14 over line 22.

The off-track write condition detector can comprise a shock detector for detecting a mechanical shock in the disk drive that exceeds a predetermined threshold. According to exemplary embodiments, off-track write condition detector 20 can be connected to a shock detector 26 for detecting the off-track write condition. Commonly-owned, co-pending U.S. patent application entitled "DISK DRIVE EMPLOYING METHOD OF RECOVERING FROM AN OFF-TRACK WRITE CONDITION BY READING AND REWRITING DATA IN AN ADJACENT TRACK", Ser. No. 09/378,612 (filed on Aug. 20, 1999), the disclosure of which is hereby incorporated by reference in its entirety, provides a description of the general operation and interaction of the components shown in FIG. 1 and provides an exemplary embodiment of a suitable shock detector 26.

The off-track write condition detector can be responsive to a head position error generated by the servo control system. According to exemplary embodiments, off-track write condition detector 20 can be responsive to a signal 24 generated by shock detector 26 implemented as part of hard disk assembly (HDA) 28 and capable of detecting external vibrations to disk drive 100 which may be of sufficient magnitude to cause an off-track write condition. Alternatively, shock detector 26 can be implemented as part of the printed circuit board (PCB) in disk drive 100, and it can be integrated into either disk controller 14 or servo control system 32. In addition, off-track write condition detector 20 can be responsive to a signal 30 generated by servo control system 32 indicating that an off-track write condition may have occurred if the head position error computed from the servo bursts exceeds some prescribed threshold.

Figure 2:
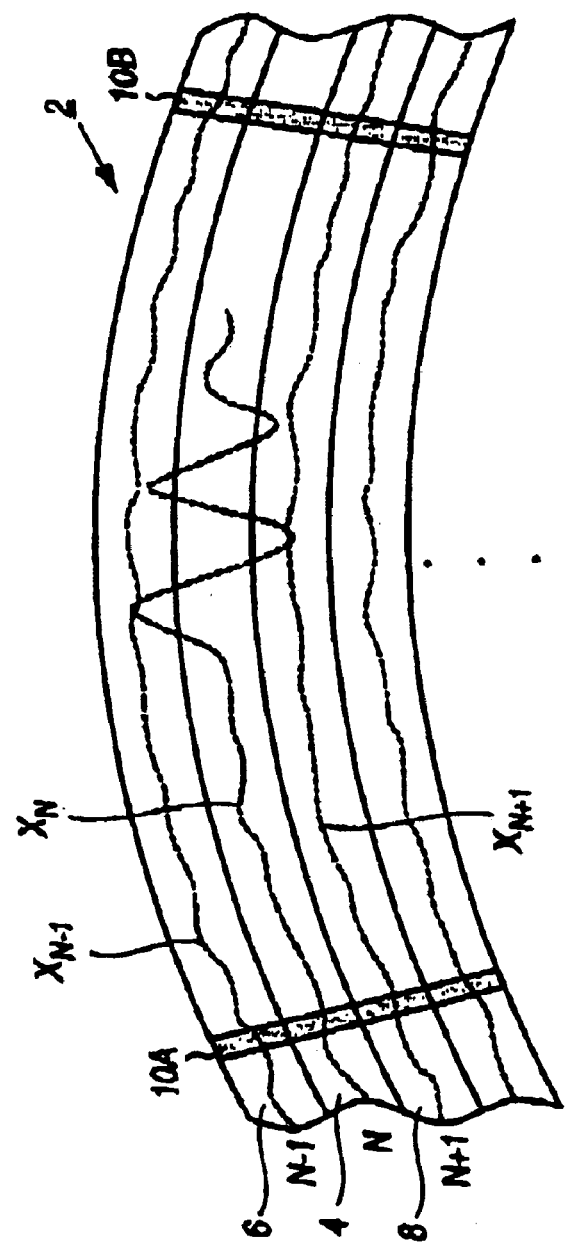
FIG. 2 illustrates an abrupt off-track write condition causing the head to deviate from the track's centerline and corrupt the data in an adjacent track.

FIG. 2 shows a section of a magnetic disk surface 2 comprising a plurality of radially spaced, concentric data tracks, including a first track (N) 4, an adjacent second track (N−1) 6, and an adjacent third track (N+1) 8. Disk surface 2 can also comprise embedded servo sectors 10A and 10B comprising servo bursts recorded at precise intervals and offset from a track's centerline which facilitate the tracking process while writing data to and reading data from the tracks. The dashed lines denote the trajectory of a head in a disk drive, such as disk drive 100 of FIG. 1, during a write operation. Typically, the head remains substantially aligned to the centerline of the track except for deviations due to imperfections in disk drive 100 and/or shock to disk drive 100.

FIG. 2 illustrates a write operation of data block $X_N$ to track (N) 4 and an off-track write condition causing the head to oscillate about the track's centerline and corrupt data blocks $X_{N-1}$ and $X_{N+1}$ recorded in adjacent tracks (N−1) 6 and (N+1) 8, respectively. Since data blocks are relative to the track in which they are contained, data block $X_N$ can be any data block on any track (N) 4. Data block $X_{N-1}$ can be any data block on a track adjacent one side of track (N) 4, and data block $X_{N+1}$ can be any data block on a track adjacent the other side of track (N) 4. In other words, there is no correspondence between the position and numbering of specific data blocks referenced herein with respect to any specific track or tracks.

The shock detector of disk drive 100 detects the occurrence of an off-track write condition so that the write operation can be aborted and a recovery procedure executed to restore the integrity of the corrupted data in the adjacent tracks. During a write operation of data block $X_N$ to track (N) 4, an off-track write condition can also occur which causes the head to gradually deviate from the track's centerline and corrupt data block $X_{N-1}$ recorded in adjacent track (N−1) 6. Such an off-track write condition can be detected by evaluating the head position error generated by a servo control system in disk drive 100 when processing the servo bursts in the following embedded servo sector 10B.

When an off-track write condition is detected while writing a first data block (e.g., a sector) to a first track (N) 4, disk controller 14 can execute the data loss prevention procedure stored in program memory 17 to restore the integrity of the data recorded in an adjacent second track, such as, for example, track (N−1) 6. For example, the steps of the data loss prevention procedure can include receiving a write command to write a first series of data blocks to a data block $X_N$ on the first track (e.g., track (N) 4).

Before writing the first series of data blocks, a second series of data blocks stored in a data block $X_{N-1}$ on the second track (e.g., adjacent track (N−1) 6) can be read. The second series of data blocks can be read from at least one specific zone of the second track, or from any portion or portions of the second track, including the entire second track. Reading of the second series of data blocks can be performed when disk drive 100 is in a mobile environment. Alternatively, according to exemplary embodiments, a user can selectively inhibit the recovery procedure to either enable or disable the performance of the procedure, depending on the user's preference. Once read, the second series of data blocks can be stored in a data buffer (e.g., data buffer 16). Writing the first series of data blocks on the first track can then be initiated.

While writing the first series of data blocks, a signal (e.g., signal 24 or signal 30) can be detected that indicates that the head may have wandered toward the second track. The signal can be detected by, for example, detecting a mechanical shock in the disk drive. Alternatively, the signal can be detected by, for example, detecting an excessive head position error by a servo control system (e.g., servo control system 32) responsible for positioning the head over the disk. The excessive head position error can be a head position error that is greater than approximately 16% of the track pitch, or any other desired percentage of track pitch. In response to the signal, the writing of the first series of data blocks can be aborted. To ensure that the head (e.g., head 12) is positioned on the first track, the head can be repositioned and track following can be performed. Repositioning of the head can occur by, for example, having a disk surface spin to a location such that the head is over a particular data block. At least a portion of the first series of data blocks can be written to the first track. At least a portion of the second series of data blocks, stored in the data buffer, can be written to the second track.

This data loss prevention procedure restores the integrity of the second data block $X_{N-1}$ by effectively overwriting the noise induced by the off-track write condition. This data loss prevention procedure can be carried out for both tracks adjacent to the track in which the off-track write condition was detected, particularly in the case of an abrupt off-track write condition, such as that shown in FIG. 2, where the likelihood of corrupting both adjacent tracks is high.

Both of tracks (N−1) 6 and (N+1) 8 that are adjacent to the first track (N) 4 can be read and rewritten to the disk surface 2 in response to a detected off-track write condition. According to an exemplary embodiment, the disk surface (e.g., disk surface 2) can comprise a third track adjacent to the first track. In the data loss prevention procedure, before writing the first series of data blocks, a third series of data blocks stored in the third track can be read and the third series of data blocks can be stored in the data buffer. Additionally, at least a portion of the third series of data blocks, stored in the data buffer, can be written to the third track.

An exemplary data loss prevention procedure stored in program memory 17 of FIG. 1 for recovering from an off-track write condition is illustrated in the flow chart shown in FIG. 3. The FIG. 3 method is directed to preventing data loss from an off-track write condition in a disk drive (e.g., disk drive 100) comprising a disk surface (e.g., disk surface 2) having a first track (e.g., track (N) 4) and a second track (e.g., track (N−1) 6) adjacent to the first track, and a head (e.g., head 12) for writing data to and reading data from the first and second tracks. At step 302, a write command is received to write a first series of data blocks on the first track. Before writing the first series of data blocks, however, a second series of data blocks stored in the second track can be read and the second series of data blocks can be stored in a data buffer. The second series of data blocks can be read from at least one specific zone of the second track, or from any portion or portions of the second track, including the entire second track. Reading of the second series of data blocks can be performed, for example, when disk drive 100 is in a mobile environment. Alternatively, according to exemplary embodiments, a user can selectively inhibit the recovery procedure to either enable or disable the performance of the procedure, depending on the user's preference.

According to exemplary embodiments, the disk controller 14 can direct servo control system 32 at step 304 to position head 12 over track (N−1) 6 and then can wait at step 306 until disk surface 2 spins to a location such that head 12 is over data block $X_{N-1}$. At step 308, the data recorded in data block $X_{N-1}$ can be read and the data from data block $X_{N-1}$ can be stored in data buffer 16. Writing of the first series of data blocks on the first track can then be initiated. Thus, according to exemplary embodiments, disk controller 14 can direct servo control system 32 at step 310 to position head 12 over track N and then can wait at step 312 until disk surface 2 spins to a location such that head 12 is over data block $X_N$. At step 314, data can be written to data block $X_N$.

While writing the first series of data blocks, a signal can be detected indicating that the head may have wandered toward the second track. The signal can be detected by, for example, detecting a mechanical shock in the disk drive. Alternatively, the signal can be detected by, for example, detecting an excessive head position error by a servo control system (e.g., servo control system 32) responsible for positioning the head over the disk. The excessive head position error can be a head position error that is greater than approximately 16% of the track pitch, or any other desired percentage of track pitch. Thus, if an off-track write condition is detected at step 316, in response to the signal, the writing of the first series of data blocks (e.g., data block $X_N$) can be aborted in step 318. The head can be repositioned on the first track and track following performed. Thus, at step 320 disk controller 42 can direct servo control system 32 to position head 12 over track (N) 4 and then can wait at step 322 until disk surface 2 spins to a location such that head 12 is over data block $X_N$. In step 324, at least a portion of the first series of data blocks can be rewritten to the first track (e.g., track (N) 4).

In step 326, disk controller 42 can direct servo control system 32 to position head 12 over track (N−1) 6 and then can wait at step 328 until disk surface 2 spins to a location such that head 12 is again over data block $X_{N-1}$. Then, at least a portion of the second series of data blocks, stored in the data buffer, can be rewritten to the second track. Thus, at step 330, the second series of data blocks stored in data buffer 16 can be rewritten to track (N−1). Before rewriting the second series of data blocks, the data stored in tracks adjacent to data block $X_{N-1}$ can be buffered to account for the possibility of a head position error during the rewriting of the second series of data blocks.

FIGS. 4A and 4B illustrate that both of the tracks (N−1) 6 and (N+1) 8 that are adjacent to the first track (N) 4 can be read and rewritten to disk surface 2 in response to a detected off-track write condition. In this exemplary embodiment, the disk surface (e.g., disk surface 2) can comprise a third track (e.g., track (N+1) 8) adjacent to the first track, and the head (e.g., head 12) can write data to and read data from the first, second, and third tracks. Consequently, before writing the first series of data blocks, a third series of data blocks stored in the third track can be read and the third series of data blocks can be stored in the data buffer. Thus, after step 308 when the data recorded in data block $X_{N-1}$ is read and stored in data buffer 16, at step 402 disk controller 14 can position head 12 over track (N+1) 8 and then can wait at step 404 until disk surface 2 spins such that head 12 is positioned over data block $X_{N+1}$. The data recorded in data block $X_{N+1}$ can then be read at step 406 and stored in data buffer 16, or in a buffer different than that used to store the data from data block $X_{N-1}$.

After step 330, when the data stored in data buffer 16 is rewritten to track (N−1) 6 at data block $X_{N-1}$, in step 408 disk controller 42 can direct servo control system 32 to position head 12 over track (N+1) 8 and then can wait at step 410 until disk surface 2 spins to a location such that head 12 is again over data block $X_{N+1}$. At step 412, the data stored in, for example, data buffer 16 (or whatever buffer used to store data from data block $X_{N+1}$) can be rewritten to track (N+1) 8 at data block $X_{N+1}$. Of course, data blocks $X_{N-1}$ and $X_{N+1}$ can be read and/or rewritten in any desired sequence.

According to an exemplary embodiment of the present invention, disk controller 14 can rewrite data to data block $X_N$ before reading and rewriting the data stored in the data blocks of adjacent tracks (N−1) 6 and (N+1) 8. Alternatively, disk controller 14 can rewrite the write data to data block $X_N$ after reading and rewriting the data stored in the data blocks of adjacent tracks (N−1) 6 and (N+1) 8.

The data block referred to in the above embodiments can represent a single data sector, or it may represent multiple data sectors. For example, when a gradual off-track write condition is detected, it may not be possible to determine exactly where the off-track write condition occurred. Thus, if multiple contiguous sectors are being written to disk surface 2 and an off-track write condition is detected, it may be necessary to buffer and rewrite all of the target data sectors, as well as to read and rewrite the data sectors of adjacent tracks (N−1) 6 and (N+1) 8 in-between embedded servo sectors 10A and 10B.

What is claimed is:

1. A method for preventing data loss from an off-track write condition in a disk drive that comprises:
   a disk surface comprising a first track and a second track adjacent to the first track, and a head for writing data to and reading data from the first and second tracks, the method comprising the steps of:
   receiving a write command to write a first series of data blocks on the first track;
   before writing the first series of data blocks, reading a second series of data blocks stored in the second track and storing the second series of data blocks in a data buffer;
   initiating writing of the first series of data blocks on the first track and while writing the first series of data blocks, detecting a signal indicating the head may have wandered toward the second track and in response to the signal:
   aborting the writing of the first series of data blocks;
   repositioning the head on the first track and performing track following;
   writing at least a portion of the first series of data blocks to the first track; and
   writing at least a portion of the second series of data blocks, stored in the data buffer, to the second track, wherein the step of detecting the signal comprises the step of:
   detecting an excessive head position error by a servo control system responsible for positioning the head over the disk, wherein the head position error is greater than approximately 16% of a track pitch.

2. The method for preventing data loss from an off-track write condition as recited in claim 1, wherein the step of detecting the signal comprises the step of:
   detecting a mechanical shock in the disk drive.

3. The method for preventing data loss from an off-track write condition as recited in claim 1, wherein the second series of data blocks is read from at least one specific zone of the second track.

4. The method for preventing data loss from an off-track write condition as recited in claim 1, wherein the step of reading the second series of data blocks is performed when the disk drive is in a mobile environment.

5. The method for preventing data loss from an off-track write condition as recited in claim 1, wherein the disk surface comprises a third track adjacent to the first track, and wherein the method comprises the step of:
   before writing the first series of data blocks, reading a third series of data blocks stored in the third track and storing the third series of data blocks in the data buffer.

6. The method for preventing data loss from an off-track write condition as recited in claim 5, comprising the step of:
   writing at least a portion of the third series of data blocks, stored in the data buffer, to the third track.

7. A disk drive comprising:
   a disk surface comprising a first track and a second track adjacent to the first track;
   a head for writing and reading data stored in the first and second tracks, wherein the head writes at least part of a first data block to the first track;

a read/write channel for encoding data written to the disk surface during a write operation and for detecting a read signal emanating from the head during a read operation;

a servo control system for generating control signals to position the head over the disk surface;

an off-track write condition detector for detecting an off-track write condition;

a data buffer for storing a data block written to the disk;

a program memory for storing steps of a procedure for preventing data loss from an off-track write condition detected by the off-track write condition detector; and a means, coupled to the read/write channel, the servo control system and the off-track write condition detector, for executing the steps of the data loss prevention procedure stored in the program memory in response to the detected off-track write condition, the data loss prevention procedure comprising the steps of:

receiving a write command to write a first series of data blocks on the first track;

before writing the first series of data blocks, reading a second series of data blocks stored in the second track and storing the second series of data blocks in a data buffer;

initiating writing of the first series of data blocks on the first track and while writing the first series of data blocks, detecting a signal indicating the head may have wandered toward the second track and in response to the signal:

aborting the writing of the first series of data blocks;

repositioning the head on the first track and performing track following;

writing at least a portion of the first series of data blocks to the first track; and writing at least a portion of the second series of data blocks, stored in the data buffer, to the second track, wherein, in the recovery procedure, the step of detecting the signal comprises the step of:

detecting an excessive head position error by a servo control system responsible for positioning the head over the disk, wherein the excessive head position error is greater than approximately 16% of a track pitch.

8. The disk drive as recited in claim 7, wherein the off-track write condition detector comprises:

a shock detector for detecting a mechanical shock in the disk drive that exceeds a predetermined threshold.

9. The disk drive as recited in claim 7, wherein the off-track write condition detector is responsive to a head position error generated by the servo control system.

10. The disk drive as recited in claim 7, wherein, in the recovery procedure, the step of detecting the signal comprises the step of:

detecting a mechanical shock in the disk drive.

11. The disk drive as recited in claim 7, wherein, in the recovery procedure, the second series of data blocks is read from at least one specific zone of the second track.

12. The disk drive as recited in claim 7, wherein, in the recovery procedure, the step of reading the second series of data blocks is performed when the disk drive is in a mobile environment.

13. The disk drive as recited in claim 7, wherein the disk surface comprises a third track adjacent to the first track, and wherein the method comprises the step of:

before writing the first series of data blocks, reading a third series of data blocks stored in the third track and storing the third series of data blocks in the data buffer.

14. The disk drive as recited in claim 13, wherein the recovery procedure comprises the step of:

writing at least a portion of the third series of data blocks, stored in the data buffer, to the third track.

* * * * *